(12) United States Patent
Bachu et al.

(10) Patent No.: US 9,468,000 B2
(45) Date of Patent: Oct. 11, 2016

(54) METHOD AND APPARATUS FOR OPTIMIZING CLOUD BASED RADIO ACCESS NETWORK

(71) Applicant: QUALCOMM Incorporated, San Diego, CA (US)

(72) Inventors: Raja Sekhar Bachu, Somerset, NJ (US); Prashanth Haridas Hande, San Diego, CA (US); Frank Anton Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 14/070,339

(22) Filed: Nov. 1, 2013

(65) Prior Publication Data

US 2015/0124782 A1    May 7, 2015

(51) Int. Cl.
*H04W 72/04* (2009.01)
*H04L 1/18* (2006.01)

(52) U.S. Cl.
CPC .......... *H04W 72/0446* (2013.01); *H04L 1/188* (2013.01); *H04L 1/1816* (2013.01); *H04L 1/1822* (2013.01); *H04L 1/1887* (2013.01)

(58) Field of Classification Search
None
See application file for complete search history.

(56) References Cited

U.S. PATENT DOCUMENTS

| | | | |
|---|---|---|---|
| 6,711,122 B1 | 3/2004 | Langley et al. | |
| 6,819,676 B1 | 11/2004 | Min | |
| 2002/0159410 A1* | 10/2002 | Odenwalder | H04L 1/0046 370/329 |
| 2012/0147815 A1 | 6/2012 | Meyer et al. | |
| 2012/0201229 A1* | 8/2012 | Feng | H04L 5/0053 370/336 |
| 2012/0300710 A1 | 11/2012 | Li et al. | |
| 2013/0034028 A1 | 2/2013 | Chen et al. | |
| 2013/0064153 A1 | 3/2013 | Klingenbrunn et al. | |

(Continued)

FOREIGN PATENT DOCUMENTS

| | | |
|---|---|---|
| EP | 2 306 665 A1 | 4/2011 |
| WO | WO-2011/035109 A2 | 3/2011 |

(Continued)

OTHER PUBLICATIONS

Calhoun P., et al., "Lightweight Access Point Protocol," RFC 5412, Feb. 2010, Retrieved from the Internet URL: http://tools.ietf.org/html/rfc5412 , Retrieved dated on Nov. 19, 2015, 126 pages.

(Continued)

*Primary Examiner* — Awet Haile
(74) *Attorney, Agent, or Firm* — Arent Fox LLP

(57) ABSTRACT

A method, apparatus are described for a cloud based radio access network (RAN). The method may include transmitting a first message from a base station to a user equipment (UE), determining that a second message from the UE is not received by a media access control (MAC) scheduler within a pre-determined time, delaying re-transmission of the first message or transmission of a third message from the base station to the UE, and scheduling other hybrid automatic repeat request (HARQ) processes of the UE in intervening sub-frames. The method may include receiving a first message from a UE at a base station, determining that a second message from the base station cannot be constructed within a pre-determined time from delays in receiving assignments from a Cloud, constructing and transmitting the second message to UEs based on assignments received earlier from the Cloud, and suspending an HARQ process associated with other UEs.

28 Claims, 12 Drawing Sheets

(56) References Cited

U.S. PATENT DOCUMENTS

2013/0100907 A1 4/2013 Liu
2014/0112282 A1\* 4/2014 Wijting .................. H04L 5/001
370/329

FOREIGN PATENT DOCUMENTS

WO WO-2011/129996 A1 10/2011
WO WO-2012/167820 A1 12/2012

OTHER PUBLICATIONS

Cisco, "LWAPP Traffic Study," Document ID: 99947, Mar. 15, 2009, Retrieved from the internet URL: http://www.cisco.com/c/en/us/support/docs/wireless-mobility/wireless-lan-wlan/99947-1, Retrieved dated on Nov. 19, 2015, 10 pages.
CPRI Common Public Radio Interface, Retrieved from the Internet URL: http://www.cpri.info/, Retrieved dated on Nov. 19, 2015, 3 pages.
C-RAN The Road Towards Green RAN, White Paper, Version 2.5, Oct. 2011, China Mobile Research Institute, 48 pages.
Flanagan T., et al., "Creating Cloud Base Stations with TI's KeyStone Multicore Architecture," Texas Instruments, Oct. 2011, 9 pages.
OBSAI Open Base Station Architecture Initiative, Retrieved from the Internet URL: http://www.obsai.com/ , Retrieved dated on Nov. 19, 2015, 1 page.
Rayal F., "Cloud RAN Vs. Small Cells: Trading Processing for Transport Cost," Mar. 17, 2012, Retrieved from the Internet URL: http://frankrayal.com/2012/03/17/cloud-ran-vs-small-cells-trading-processing-for-transport-cost/ , Retrieved dated on Nov. 19, 2015, 3 pages.
LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10), ETSI TS 136 300 V10.2.0 (Jan. 2011) Technical Specification.
Suggestions on Potential Solutions to C-RAN, The Engine of Broadband Wireless Innovation, Jan. 3, 2013, pp. 1-41, version 4.0, Friedrich-Ebert-Anlage 58, 60325 Frankfurt, Germany.
Partial International Search Report—PCT/US2014/062857—ISA/EPO—Jan. 20, 2015. (7 total pages).
International Search Report and Written Opinion—PCT/US2014/062857—ISA/EPO—May 4, 2015. (24 total pages).

\* cited by examiner

METHOD AND APPARATUS FOR OPTIMIZING CLOUD BASED RADIO ACCESS NETWORK

BACKGROUND

Aspects of the present disclosure relate generally to wireless communications, and more particularly to cloud based radio access networks.

In traditional radio access networks (TRAN), L2/L1 functions of the RAN are implemented in a node called base station or eNodeB. The base station is generally connected to a core network through an IP transport backhaul, which is typically a wired connection. The base stations are also connected to each other for mobility management purposes.

In a distributed base station architecture, a radio frequency (RF) processing unit is co-located with a baseband unit in the base station. This may result in power inefficiencies because of losses over the cables to the antennas. This problem may be tackled by placing the RF processing unit close to the antennas. However, this requires a high bandwidth (for example, Gbps) short cable to transport baseband samples from the baseband unit to the RF processing unit.

In traditional cloud based radio access networks (CRAN), the baseband processing may be performed by a pool of processors in the cloud and the samples are transported to the RF processing units over long distances (for example, in the order of 40 km) optical backhauls. However, this requires high bandwidth and low latency backhaul which are very expensive to build and manage for network operators.

Therefore, there is a desire for a method and an apparatus for optimizing cloud based radio access network.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for optimizing a cloud based radio access network (RAN) that includes transmitting a first message from a base station to a user equipment (UE), determining that a second message from the user equipment (UE) in response to the first message from the base station is not received by a media access control (MAC) scheduler within a pre-determined amount of time, delaying re-transmission of the first message or transmission of a third message from the base station to the UE, and scheduling other hybrid automatic repeat request (HARQ) processes of the UE or other UEs in intervening sub-frames. Further, the present disclosure presents an additional example method and apparatus for a cloud based radio access network (RAN) that includes receiving a first message from a user equipment (UE) at a base station, determining that a second message from the base station in response to the first message from the UE cannot be constructed within a pre-determined amount of time due to delay in receiving individual assignments from a Cloud, constructing and transmitting the second message to a first set of UEs based on multiple sets of assignments received earlier from the Cloud, and suspending a hybrid automatic repeat request (HARQ) process associated with a second set of UEs.

In an additional aspect, an apparatus for optimizing a cloud based radio access network (RAN) that includes means for transmitting a first message from a base station to a user equipment (UE), means for determining that a second message from the user equipment (UE) in response to the first message from the base station is not received by a media access control (MAC) scheduler within a pre-determined amount of time, means for delaying re-transmission of the first message or transmission of a third message from the base station to the UE, and means for scheduling other hybrid automatic repeat request (HARQ) processes of the UE or other UEs in intervening sub-frames. Further an additional example is disclosed of an apparatus for a cloud based radio access network (RAN) that includes means for receiving a first message from a user equipment (UE) at a base station, means for determining that a second message from the base station in response to the first message from the UE cannot be constructed within a pre-determined amount of time due to delay in receiving individual assignments from a Cloud, means for constructing and transmitting the second message to a first set of UEs based on multiple sets of assignments received earlier from the Cloud, and means for suspending a hybrid automatic repeat request (HARQ) process associated with a second set of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for optimizing a cloud based radio access network (RAN) that includes transmitting a first message from a base station to a user equipment (UE), determining that a second message from the user equipment (UE) in response to the first message from the base station is not received by a media access control (MAC) scheduler within a pre-determined amount of time, delaying re-transmission of the first message or transmission of a third message from the base station to the UE, and scheduling other hybrid automatic repeat request (HARQ) processes of the UE or other UEs in intervening sub-frames. Further, the present disclosure provides an additional method and apparatus for a cloud based radio access network (RAN) that includes receiving a first message from a user equipment (UE) at a base station, determining that a second message from the base station in response to the first message from the UE cannot be constructed within a pre-determined amount of time due to delay in receiving individual assignments from a Cloud, constructing and transmitting the second message to a first set of UEs based on multiple sets of assignments received earlier from the Cloud, and suspending a hybrid automatic repeat request (HARQ) process associated with a second set of UEs.

Figure 1:
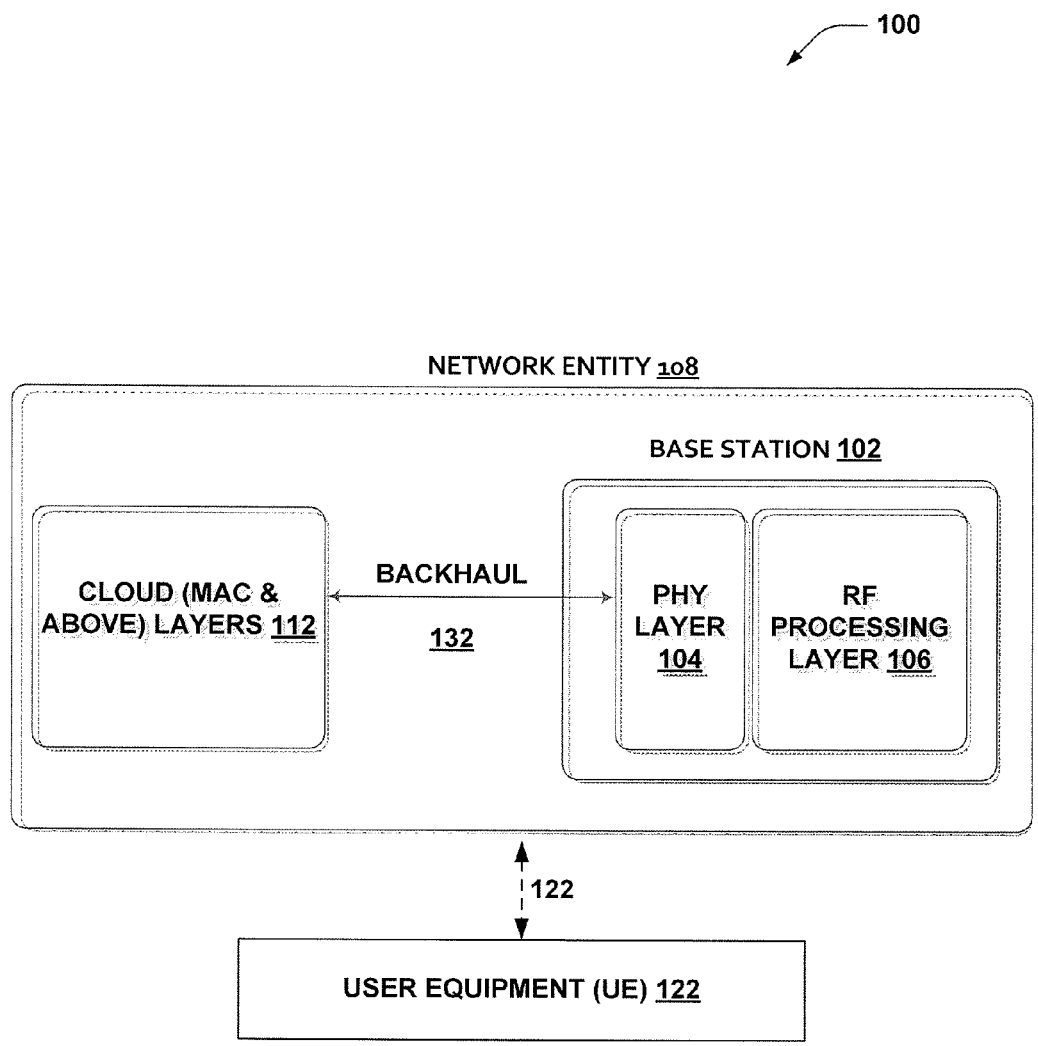
FIG. 1 is a block diagram of an example wireless communication system for optimizing cloud based radio access network of aspects of the present disclosure.

Referring to FIG. 1, a wireless communication system 100 is illustrated that facilitates an optimized cloud radio access network (CRAN). System 100 includes network entity 108 that may include one or more base stations, for example, base station 102, in communication with a cloud entity 122 over one or more communication links, for example, backhaul 132.

Base station 102 may include, but not limited to, an access point, a base station (BS) or Node B or eNodeB, a macro cell, a femtocell, a pico cell, and a relay point. Additionally, base station 102 may include one or more of any type of network components that may enable one or more UEs 122 to communicate and/or establish and/or maintain links 124 with the base station.

In an aspect, for example, base station 102 may operate according to a radio access technology (RAT) standard, such as but not limited to GSM, CDMA, W-CDMA, HSPA or a LTE. In an additional aspect, UE 122 may be camped on a network operating on any of these standards and may communicate with another UE camped on a network operating on the same RAT standard or a different RAT standard. For example, UE 122 may be a UMTS or LTE UE.

In an aspect, base station 102 may be configured to include a PHY (physical) layer and a RF processing layer. For example, in an aspect, base station 102 may be configured to include PHY layer 104 and RF processing layer 106. In an aspect, cloud 112 may be configured to include media access control (MAC) and above layers (for example, radio link control (RLC) layer and/or packet data convergence protocol (PDCP) layer). In an aspect, for example, this configuration may be called as Remote PHY (RPHY) configuration. The benefits of such configuration may include, for example, backhaul requirements similar to air link rates and lower than the backhaul requirements of traditional cloud based radio access networks as described above.

For example, two aspects of RPHY deployments are described. For example, RPHY deployment in Enterprise Configuration (RPHY-E) and Home Configuration (RPHY-H). In an aspect, for example, RPHYE may be similar to current enterprise Wi-Fi deployments. The WiFi controller may be replaced by a cloud server, for example, cloud 112, that may implement the MAC and above layers which may have dedicated high speed connections to the RPHY/RF modules. The delay between the Wi-Fi controller in the cloud 112 and terminating RPHY is small enough to be absorbed into processing times of hybrid automatic repeat request (HARQ) protocol. In another aspect, for example, shared backhaul may result in unpredictable but bounded delays, for example, assuming delays in the range of 10 s of milliseconds (ms). In an aspect, for example, in RPHY-H deployment, the backhaul rates for home configuration, in general, are much smaller than the maximum air interface rates. This configuration may improve the utilization of backhaul over traditional cloud based RAN architecture. In an additional aspect, RPHYH may enable better interference management over a TRAN based network, for example, TRAN based small cells.

In an aspect, the backhaul in RPHY may transport data and MAC-PHY control messages. For efficient utilization, the MAC-PHY messages may consume only fraction of the backhaul bandwidth.

In an aspect, for example, light weight access point protocol (LWAPP) may operate at layer 2 (L2) or layer 3 (L3). For example, for L2 support, LWAPP messages may be carried in a native Ethernet frame. As such, the protocol is not routable and depends upon Layer 2 connectivity. Layer 3 support may be provided by encapsulating the LWAPP message within UDP/IP. In an aspect, LWAPP Transport layer may carry two types of payload. For example, LWAPP data messages are forwarded wireless frames. LWAPP control messages are management messages exchanged between a wireless termination point (WTP) and an access controller (AC).

In an aspect, for example, for RPHY, WTP may correspond to RPHY small cell and AC may correspond to the MAC and above layers implemented in the Cloud. LWAPP may allow for introduction of technology-specific new control channel commands. This feature may be used to encapsulate MAC-PHY messages in control channel commands. The transport blocks may be sent over data messages. For RPHYH, IPSec may be required to secure the control channel messages on backhaul.

Figure 2:
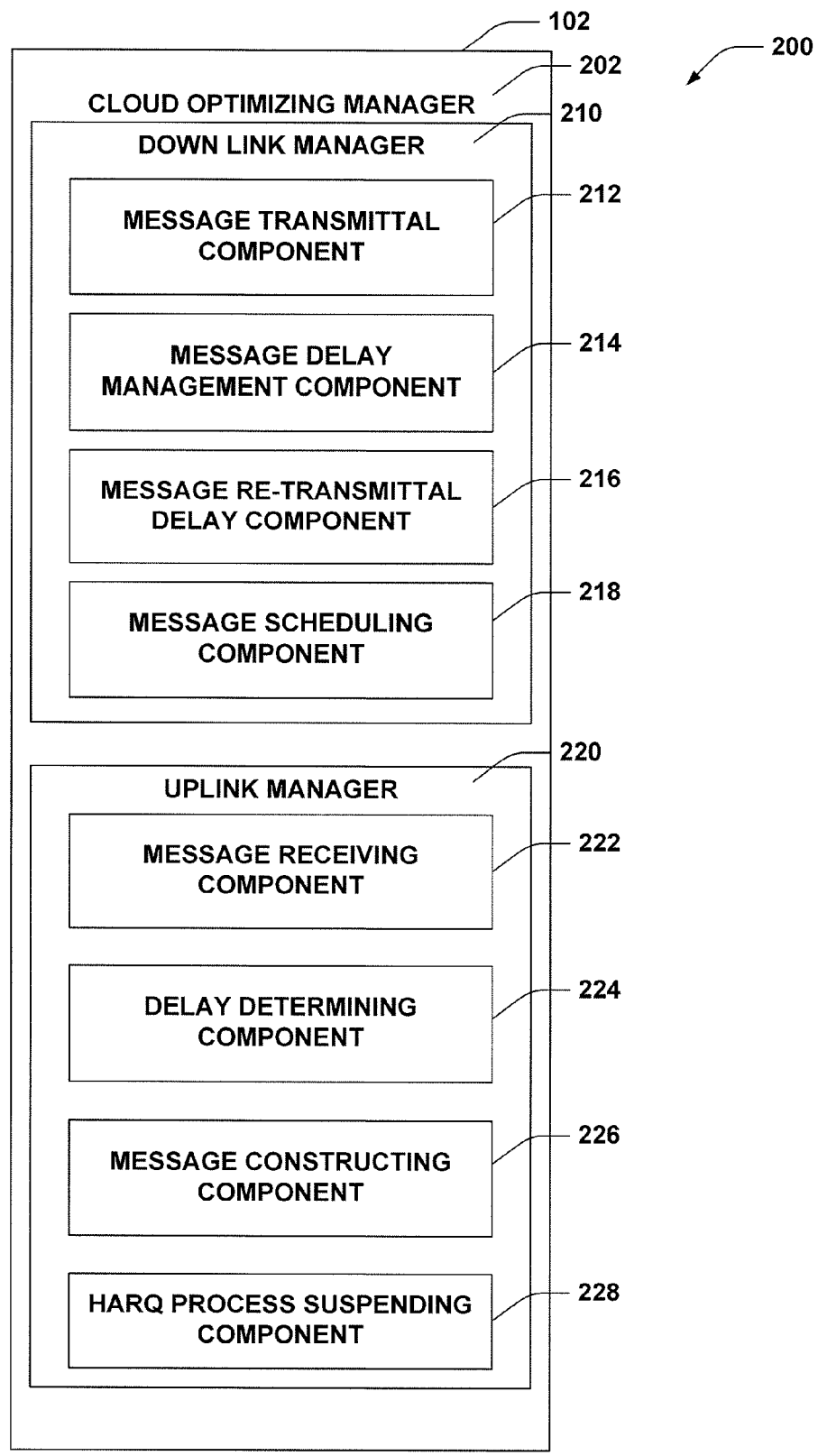
FIG. 2 is a block diagram of another example wireless communication system of aspects of the present disclosure.

FIG. 2 is a block diagram that illustrates an example aspect for optimizing a cloud based radio access network (RAN). In an aspect, for example, base station 102 may be configured to include a cloud optimizing manager 202 that includes a down link manager 210 and/or an uplink manager 220 for optimizing a cloud based RAN.

In an example aspect, cloud optimizing manager 202 and/or downlink manager 210 may be configured to include a message transmittal component 212 which may be configured to transmit a first message from a base station to a UE. For example, in an aspect, message transmittal component 212 may be configured to transmit a first message from base station 102 to user equipment (UE) 122 on the downlink (DL).

Additionally, in an aspect, cloud optimizing manager 202 and/or downlink manager 210 may be configured to include a message delay management component 214. In an aspect, message delay management component 214 may be configured to determine that a second message from the user equipment (UE), in response to the first message from the base station, e.g., an ACK message for the first message, is not received by a MAC scheduler within a pre-determined amount of time. In an aspect, the second message from UE 122 may be received at base station 102 as per the time limits described in 3GPP Specifications. However, in the proposed RPHY architecture, the second message from UE 122 may be received late at cloud 112.

Further, in an aspect, cloud optimizing manager 202 and/or downlink manager 210 may be configured to include a message re-transmittal delay component 216. For example, in an aspect, message re-transmittal delay component 216 may be configured to delay re-transmission of the first message to the UE or transmission of a different message from the base station to the UE.

Furthermore, in an aspect, cloud optimizing manager 202 and/or downlink manager 210 may be configured to include message scheduling component 218. For example, in an aspect, message delay scheduling component 218 of base station 102 may be configured to schedule other hybrid automatic request (HARQ) processes of UE 122 or other UEs in the intervening frames In an example aspect of cloud optimizing manager, cloud optimizing manager 202 and/or uplink manager 220 may be configured to include a message receiving component 222. For example, in an aspect, message receiving component 222 may be configured to receive a first message from UE 122 on the UL.

Additionally, in an additional or optional aspect, cloud optimizing manager 202 and/or uplink manager 220 may be configured to determine that a second message from the base station in response to the first message from the UE cannot be constructed within a pre-determined amount of time due to delay in receiving individual assignments from a Cloud. For example, in an aspect, delay determining component 224 may be configured to determine that a second message from base station 102 in response to the first message from UE 122 cannot be constructed within a pre-determined amount of time due to delay in receiving individual assignments from Cloud 112. In an additional aspect, the pre-determined amount of time may be defined in the 3GPP Specifications.

Further, in an additional or optional aspect, cloud optimizing manager 202 and/or uplink manager 220 may be configured to include to a message constructing component 226. For example, message constructing component 226 may be configured to construct and transmit the second message to a first set of UEs based on multiple sets of assignments received earlier from the Cloud.

Furthermore, in an additional or optional aspect, cloud optimizing manager 202 and/or uplink manager 220 may be configured to include a HARQ process suspending component 228. For example, in an aspect, HARQ process suspending component 228 may be configured to suspend a HARQ process associated with a second set of UEs.

Figure 3:
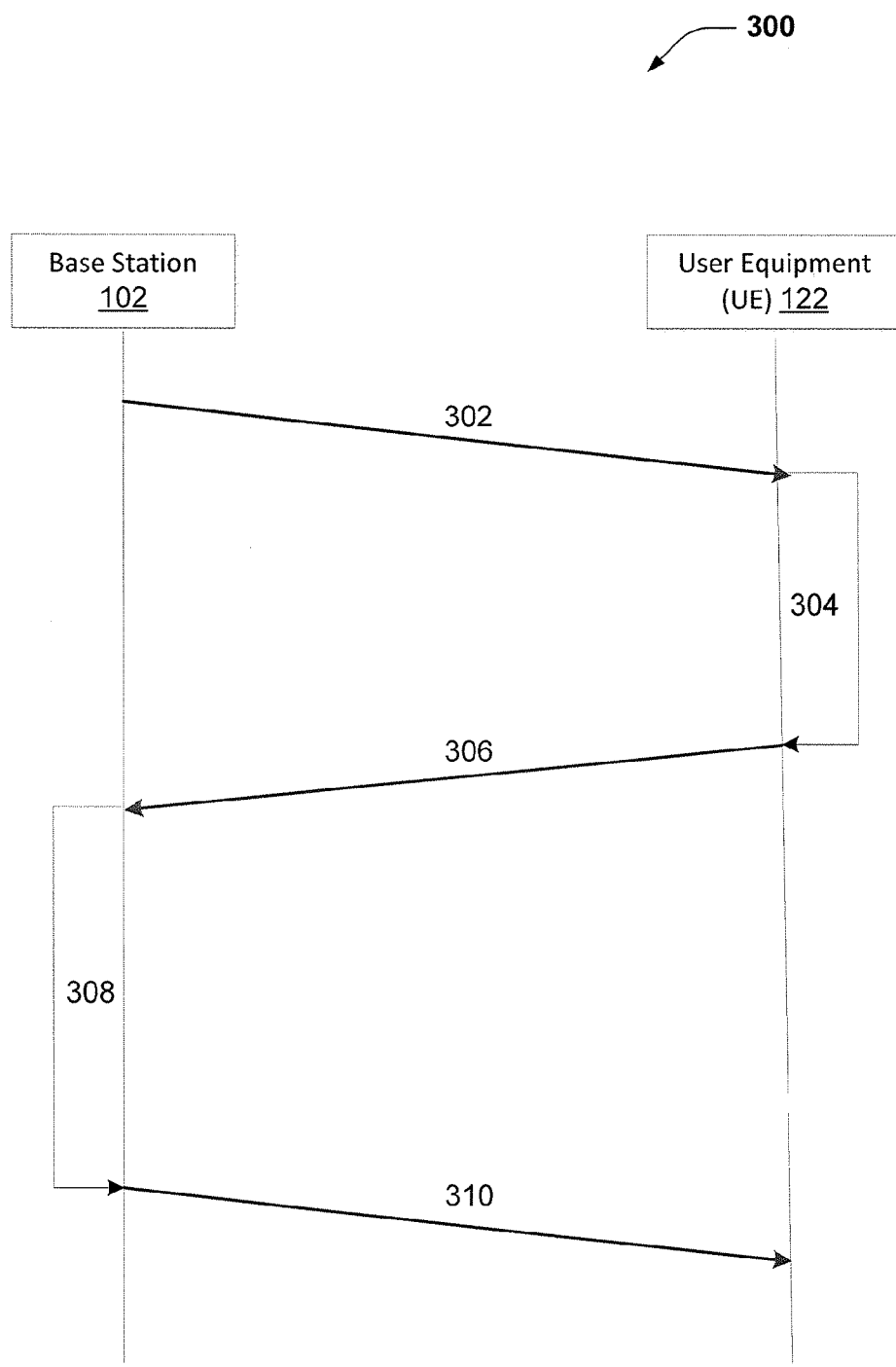
FIG. 3 is an example message flow diagram illustrating an example downlink (DL) aspect of the present disclosure.

FIG. 3 illustrates an example aspect of a flow diagram illustrating a downlink (DL) aspect of the present disclosure. In an aspect, for example, the message flow includes optimizing CRAN on the downlink communications between base station 102 and user equipment (UE) 122. In an aspect, at step 302, base station 102 sends a message, for example, a first message, to UE 122 on a Physical Downlink Shared Channel (PDSCH) to UE 122 at time "T."

At step 304, UE 122 receives the message sent from base station 102 on the PDSCH at time "T+$T_p$," where $T_p$ is the propagation time of the message from base station 102 to UE 122. Once the UE receives the message from the base station, the UE decodes the messages received on the PDSCH.

At step 306, after the decoding of the message received on the PDSCH is complete, UE 122 sends a second message to the base station in response to the first message, for example, encodes an ACK message and transmits to the base station by "T+3" ms.

At step 308, base station 102 receives the transmitted ACK message from the UE at "T+3+Tp". The base station decodes the ACK message and transmits the ACK to the cloud, for example cloud 112. The multiple sets of assignments are calculated in the MAC layer of cloud 112 and sent to the base station, for example layer 104 and/or 106. In an aspect, the multiple sets of assignments are sent to the base station to enable the cloud not to wait until the decoded ACK messages are received from the base station. For example, the MAC layer at cloud 112 (e.g., upper MAC layer) sends multiple sets of assignments to the base station before receiving the decoded ACKs from the base station. These multiple sets of assignments are available at the base station so that the MAC layer at the base station (e.g., lower MAC layer) can perform just in time scheduling.

In an aspect, the transmission of the decoded ACK messages from the base station to the cloud and the receipt of the multiple sets of assignments from the cloud are asynchronous. In an aspect, the base station selects one set of assignment from the multiple subsets of the assignments received from the cloud based on the decoding of the ACK message described above.

At step 310, PDCCH/PDSCH re-transmits the message based on the decoding of the acknowledgement and the assignment at "T+K" ms. For example, if the decoding of the ACK message indicates a successful receipt of the message at the UE, a new message may be transmitted. In an aspect, the re-transmission of the message may depend on the assignment of resources from the cloud. In an additional or optional aspect, if the decoding of the ACK message indicates a non-successful receipt of the message at the UE, the re-transmission of the message may be delayed. In an aspect, the re-transmission of the messages may occur at "T+K," where K>5 or K>8. In an aspect, generally K>8.

Figure 4:
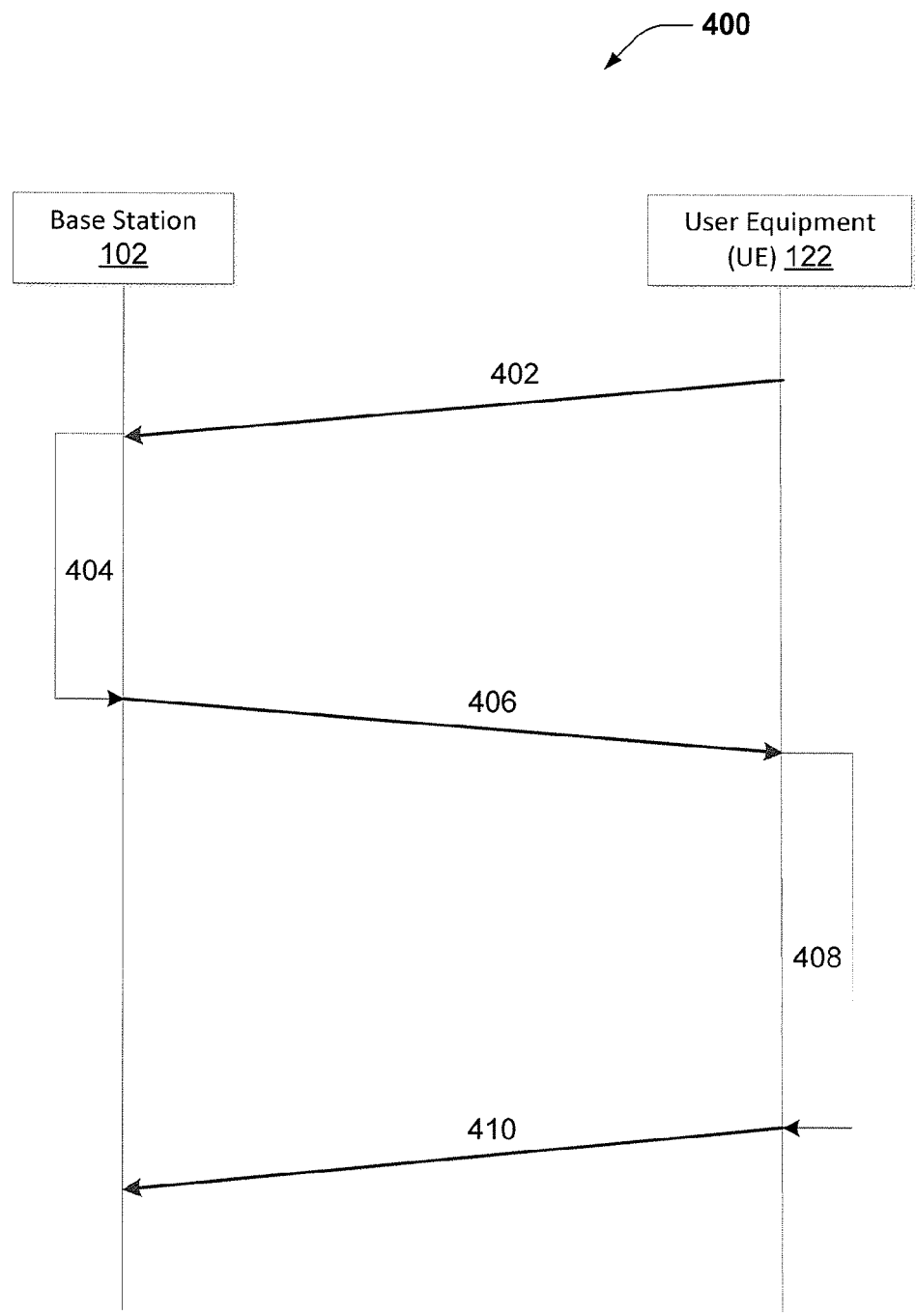
FIG. 4 is an example message flow diagram illustrating an example uplink (UL) aspect of the present disclosure.

FIG. 4 illustrates an example aspect of a flow diagram illustrating an uplink (UL) aspect of the present disclosure. In an aspect, for example, the message flow includes optimizing CRAN on the uplink communication between user equipment 122 and base station 102. In an aspect, at step 402, UE 122 transmits a message on the Physical Uplink Shared Channel (PUSCH) to base station 102 at "T" ms.

At step 404, base station 102 receives the message sent from UE 122 on the PUSCH at time "T+$T_p$," where $T_p$ is the propagation time of the message UE 122 to base station 102. Once the base station receives the message from the base station, the base station decodes the messages received on the PUSCH and sends the decoded results to the cloud, for example, could 112.

In an aspect, multiple sets of assignments for a subset of UEs, for example, higher priority UEs, may be computed in the upper MAC, for example, cloud 112, and sent to the end node, base station 102 before the decoded results are received in the cloud from the base station. The base station selects one set of assignments for the subset of the UEs chosen by the MAC scheduler in the cloud and suspends the transmission for remaining UEs.

At step 406, the base station transmits an ACK/NACK on the Physical Hybrid ARQ Indicator Channel (PHICH) for messages received from the UE on the uplink at time "T+3" ms. In an additional aspect, the Physical Downlink Control Channel (PDCCH) may transmit downlink control information (DCI) message such as downlink resource assignments at time "T+3" ms. In an aspect, for UEs which did not get assignments, base station suspends transmission until it receives assignments.

At step 408, UE 122 receives the messages from the base station at "T+3+Tp." Once the UE receives the messages from the base station, the PHICH/PDCCH messages are decoded, and a PUSCH message is encoded.

At step 410, the encoded PUSCH message is transmitted at "T+K." In an aspect, PUSCH re-transmission occurs at multiple of 8 ms interval, for example, K=8, 16, 24 etc ms.

Figure 5:
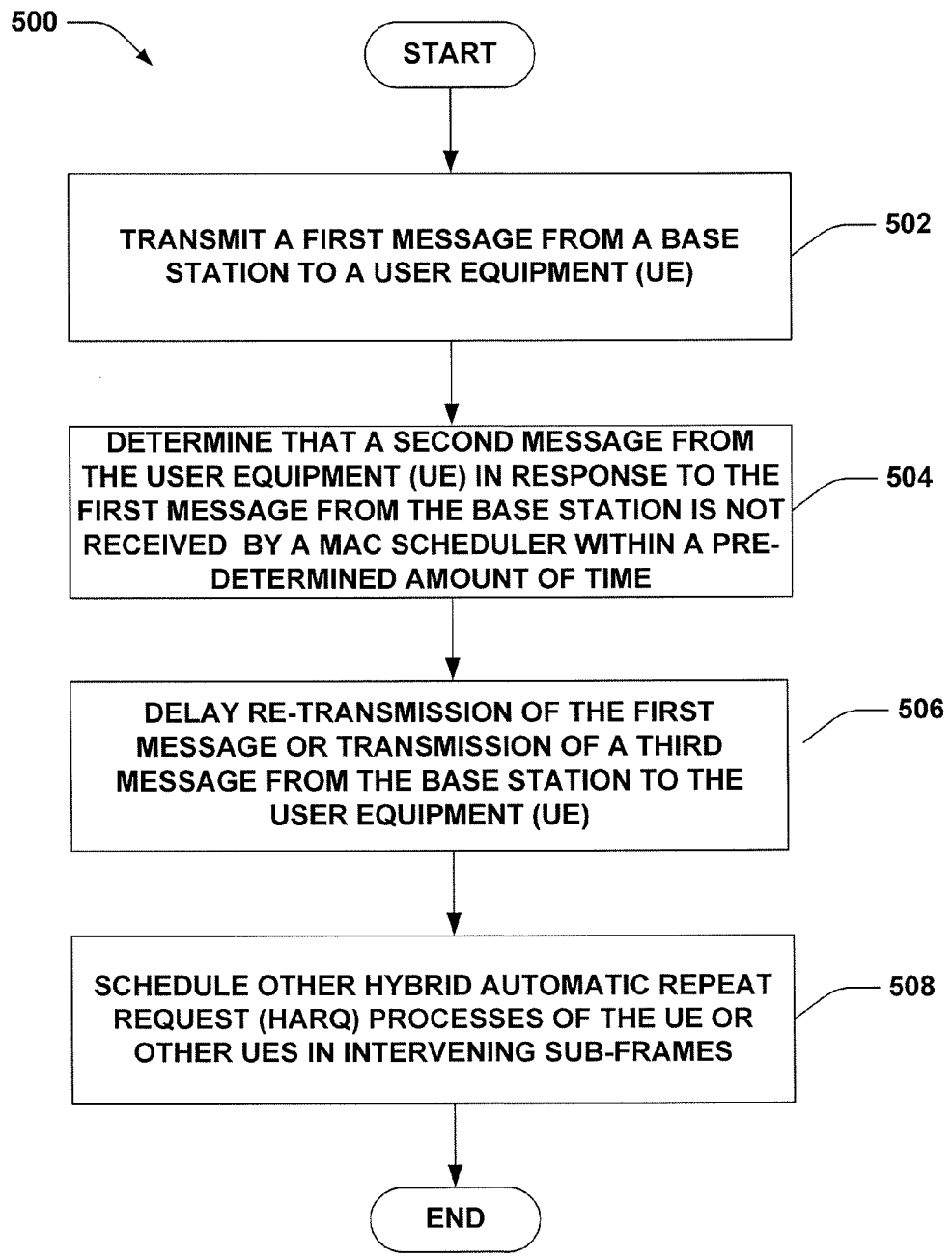
FIG. 5 is a flow diagram illustrating an example method for optimizing a downlink (DL) communication of a cloud based radio access network (RAN)

FIG. 5 is a flow diagram illustrating an example method for optimizing a downlink (DL) communication of a cloud based radio access network (RAN);

At block 502, methodology 500 may include transmitting a first message from a base station to a user equipment (UE). For example, in an aspect, base station 102 and/or cloud optimizing manager 202 and/or message transmittal component 204 may be configured to transmit a first message from a base station to a user equipment (UE).

Further, at block 504, methodology 500 may include determining that a second message from the user equipment (UE) in response to the first message from the base station is not received by a MAC scheduler within a pre-determined amount of time. For example, in an aspect, base station 102 and/or cloud optimizing manager 202 and/or message delay management component 206 may be configured to determine that a second message from the user equipment (UE) in response to the first message from the base station is not received by a MAC scheduler within a pre-determined amount of time.

Furthermore, at block 506, methodology 500 may include delaying re-transmission of the first message or transmission of a third message from the base station to the UE. For example, in an aspect, base station 102 and/or cloud optimizing manager 202 and/or message delay management component 206 may be configured to delay re-transmission of the first message or transmission of a third message from the base station to the UE.

Additionally, at block 508, methodology 500 may include scheduling other hybrid automatic repeat request (HARQ) processes of the UE or other UEs in intervening sub-frames. For example, in an aspect, base station 102 and/or cloud optimizing manager 202 and/or message scheduling component 208 may be configured to schedule other hybrid automatic repeat request (HARQ) processes of the UE or other UEs in intervening sub-frames.

The methodology 500 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 6:
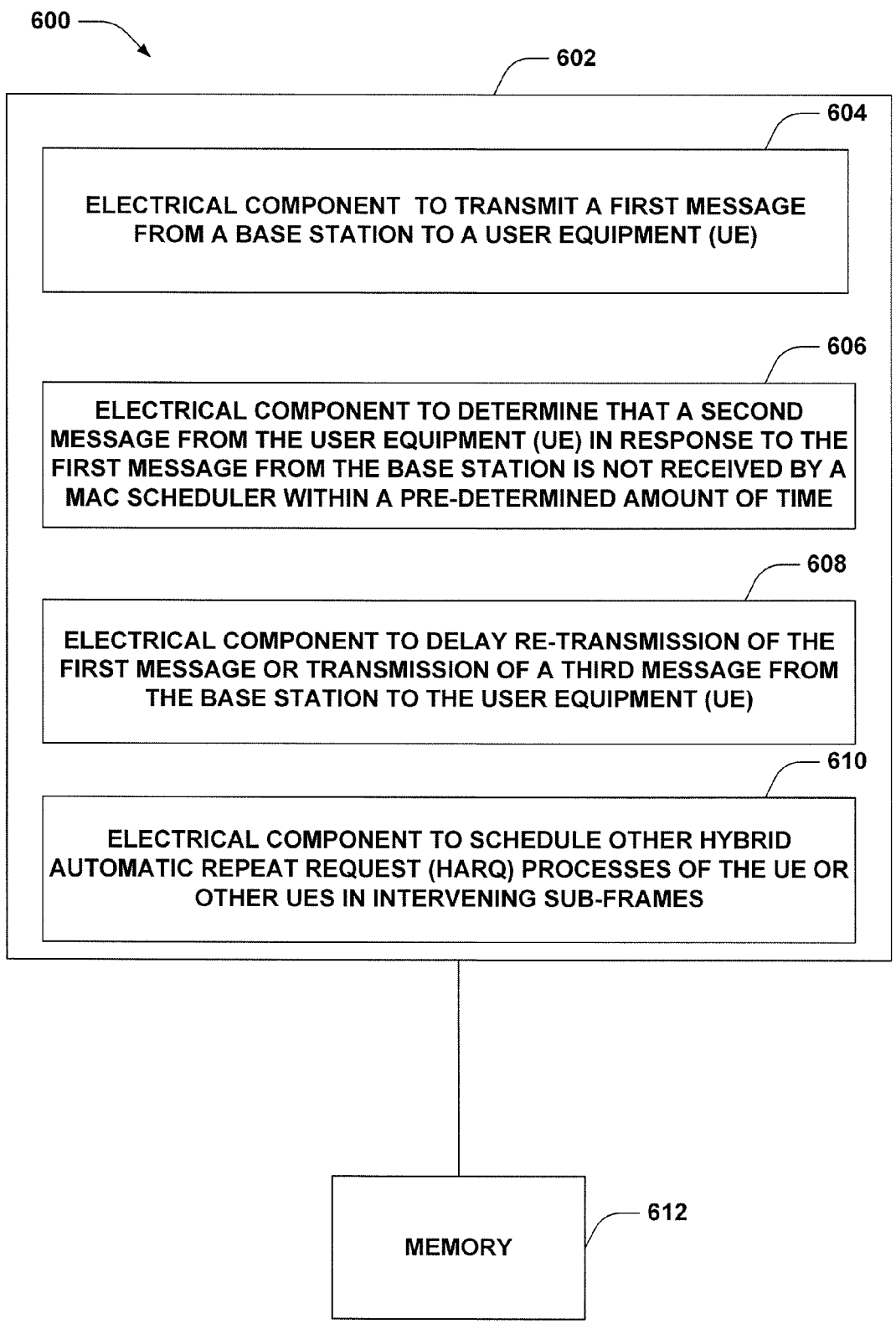
FIG. 6 is a block diagram illustrating aspects of a logical grouping of electrical components for optimizing a downlink (DL) of a cloud based radio access network (RAN)

Referring to FIG. 6, an example system 600 is displayed for optimizing a cloud based radio access network (RAN) in the downlink. For example, system 600 can reside partially within base station 102 and/or cloud optimizing manager 112 (FIGS. 1-2). It is to be appreciated that system 600 is represented as including functional blocks, which can be functional blocks that represent functions implemented by a processor, software, or a combination thereof (for example, firmware). System 600 includes a logical grouping 602 of electrical components that can act in conjunction.

For instance, logical grouping 602 can include an electrical component 604 for transmitting a first message from a base station to a user equipment (UE). In an aspect, for example, electrical component 604 may comprise cloud optimizing manager 202 and/or message transmittal component 204.

Additionally, logical grouping 602 can include an electrical component 606 for determining that a second message from the user equipment (UE) in response to the first message from the base station is not received by a MAC scheduler within a pre-determined amount of time. In an aspect, for example, electrical component 604 may comprise cloud optimizing manager 202 and/or message delay management component 206.

Further, logical grouping 602 can include an electrical component 608 for delaying re-transmission of the first message or transmission of a third message from the base station to the UE. In an aspect, for example, electrical component 608 may comprise cloud optimizing manager 202 and/or message delay management component 206.

Furthermore, logical grouping 602 can include an electrical component 610 for scheduling other hybrid automatic repeat request (HARQ) processes of the UE or other UEs in intervening sub-frames. In an aspect, for example, electrical component 608 may comprise cloud optimizing manager 202 and/or message scheduling component 208.

Additionally, system 600 can include a memory 612 that retains instructions for executing functions associated with electrical components 604, 606, 608 and/or 610. While shown as being external to memory 612, it is to be understood that one or more of the electrical components 604, 606, 608 and/or 610 can exist within memory 612. In one example, electrical components 604, 606, 608 and/or 610 can include at least one processor, or each electrical component 604, 606, 608 and/or 610 can be a corresponding module of at least one processor. Moreover, in an additional or alternative example, electrical components 604, 606, 608 and/or 610 can be a computer program product comprising a computer readable medium, where each electrical component 604, 606, 608 and/or 610 can be corresponding code.

Figure 7:
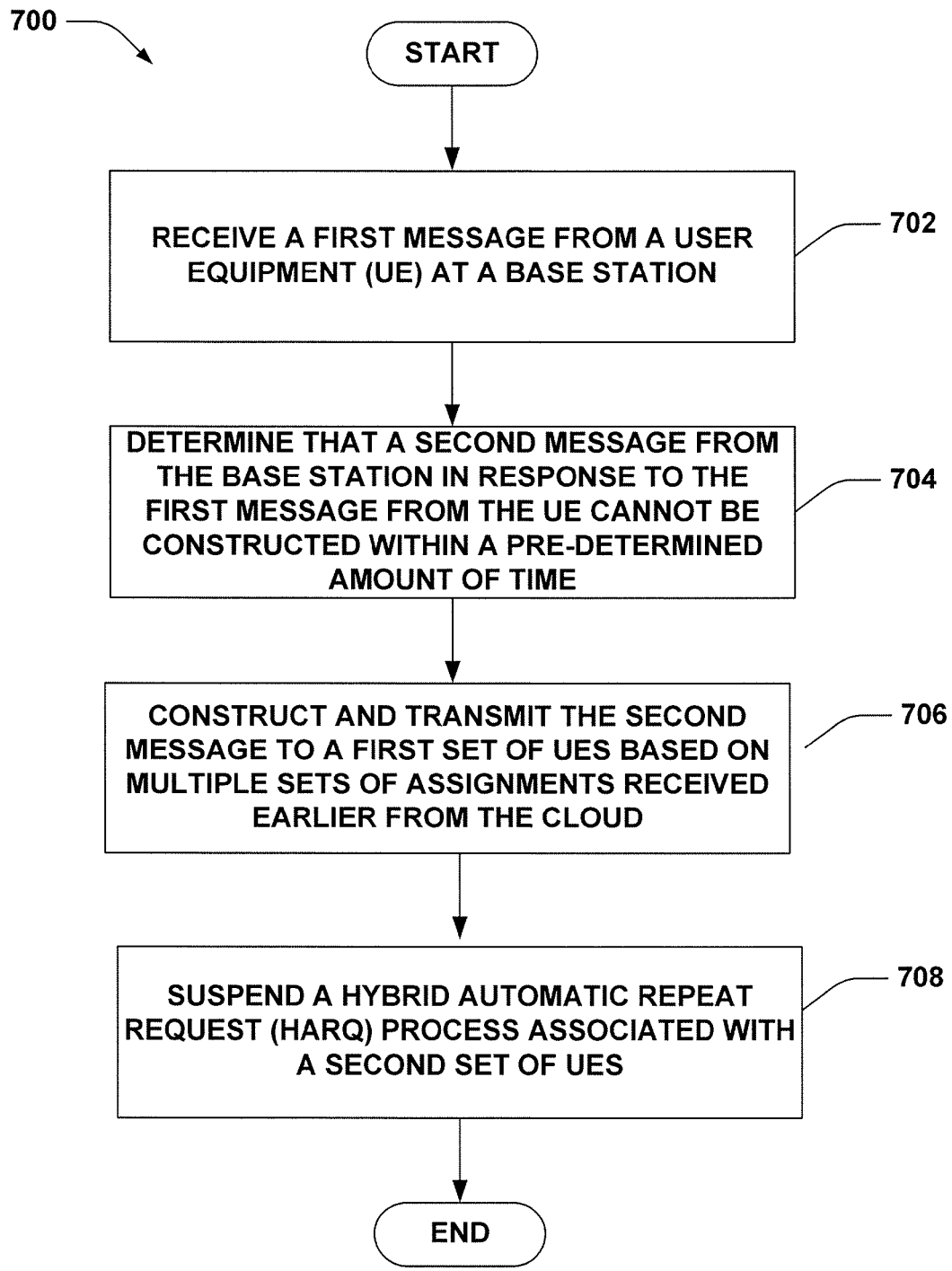
FIG. 7 is a flow diagram illustrating an example method for optimizing an uplink (UL) communication of a cloud based radio access network (RAN)

FIG. 7 is a flow diagram illustrating an example method for optimizing an uplink communication of a cloud based radio access network (RAN).

At block 702, methodology 700 may include receiving a first message from a user equipment (UE) at a base station. For example, in an aspect, base station 102 and/or message receiving component 222 may be configured to receive a first message from a user equipment (UE) at a base station.

Further, at block 704, methodology 700 may include determining that a second message from the base station in response to the first message from the UE cannot be constructed within a pre-determined amount of time due to delay in receiving individual assignments from a Cloud. For example, in an aspect, base station 102 and/or delay determining component 224 may be configured to determine that a second message from the base station in response to the first message from the UE cannot be constructed within a pre-determined amount of time due to delay in receiving individual assignments from a Cloud.

Furthermore, at block 706, methodology 700 may include constructing and transmitting the second message to a first set of UEs based on multiple sets of assignments received earlier from the Cloud. For example, in an aspect, base station 102 and/or message constructing component 226 may be configured to construct and transmit the second message to a first set of UEs based on multiple sets of assignments received earlier from the Cloud Furthermore, at block 708, methodology 700 may include suspending a hybrid automatic repeat request (HARQ) process associated with a second set of UEs. For example, in an aspect, base station 102 and/or HARQ process suspending component 228 may be configured to suspend a hybrid automatic repeat request (HARQ) process associated with a second of UEs.

The methodology 700 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 8:
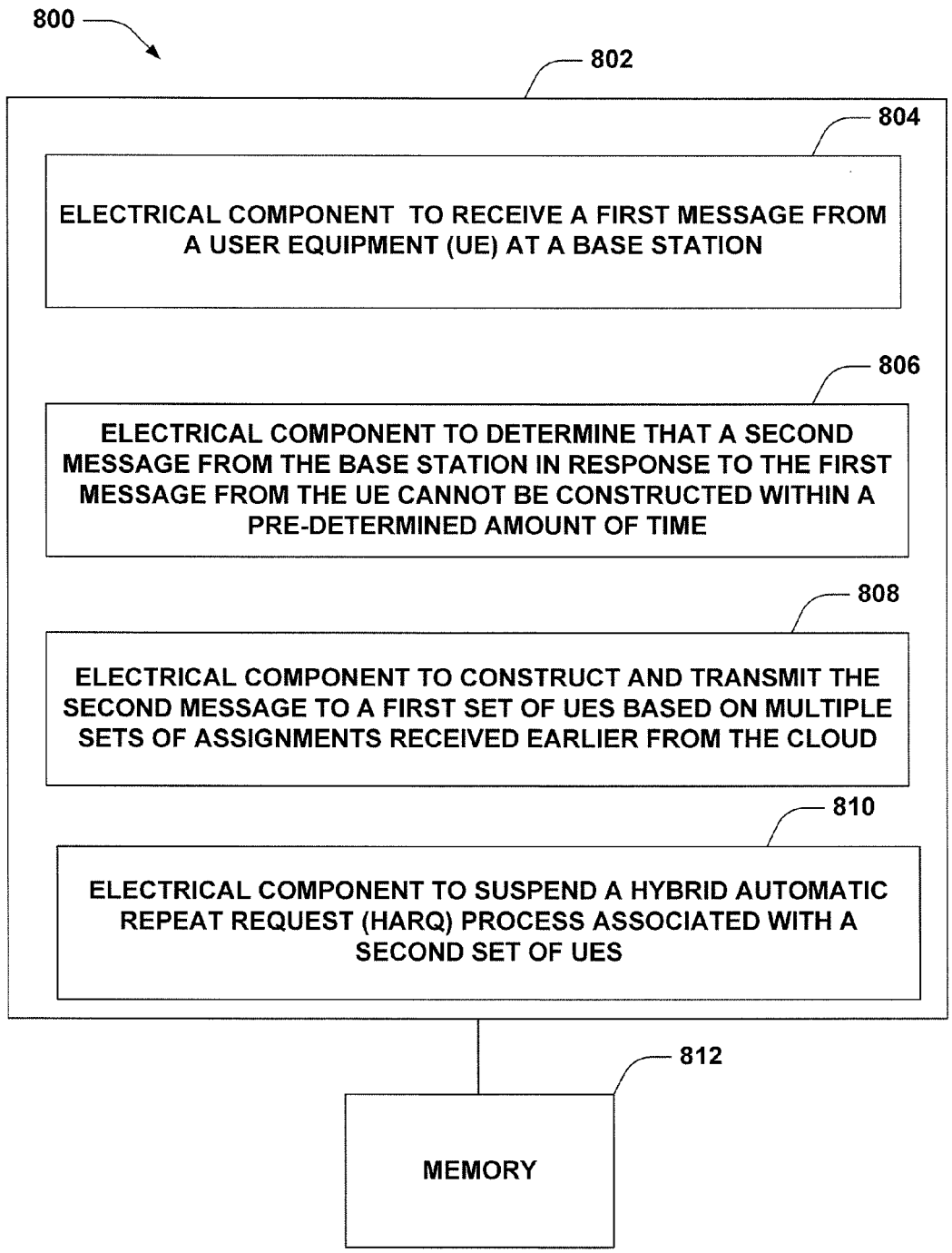
FIG. 8 is a block diagram illustrating aspects of a logical grouping of electrical components for optimizing an uplink (UL) communication of a cloud based radio access network (RAN)

Referring to FIG. 8, an example system 800 is displayed for optimizing a cloud based radio access network (RAN) in the uplink. For example, system 800 can reside partially within base station 102 (FIGS. 1-2). It is to be appreciated that system 800 is represented as including functional blocks, which can be functional blocks that represent functions implemented by a processor, software, or a combination thereof (for example, firmware). System 800 includes a logical grouping 802 of electrical components that can act in conjunction.

For instance, logical grouping 802 can include an electrical component 804 for receiving a first message from a user equipment (UE) at a base station. In an aspect, for example, electrical component 804 may comprise message receiving component 222.

Additionally, logical grouping 802 can include an electrical component 806 for determining that a second message from the base station in response to the first message from the UE cannot be constructed within a pre-determined amount of time due to delay in receiving individual assignments from a Cloud. In an aspect, for example, electrical component 806 may comprise delay determining component 224.

Further, logical grouping 802 can include an electrical component 808 for constructing and transmitting the second message to a first set of UEs based on multiple sets of assignments received earlier from the Cloud. In an aspect, for example, electrical component 802 may comprise message constructing component 226.

Furthermore, logical grouping 802 can include an electrical component 810 for suspending a hybrid automatic repeat request (HARQ) process associated with a second set of UEs. In an aspect, for example, electrical component 802 may comprise HARQ process suspending component 228.

Additionally, system 800 can include a memory 812 that retains instructions for executing functions associated with electrical components 804, 806, 808, and/or 810. While shown as being external to memory 812, it is to be understood that one or more of the electrical components 804, 806, 808, and/or 810 can exist within memory 812. In one example, electrical components 804, 806, 808, and/or 810 can include at least one processor, or each electrical component 804, 806, 808, and/or 810 can be a corresponding module of at least one processor. Moreover, in an additional or alternative example, electrical components 804, 806, 808, and/or 810 can be a computer program product comprising a computer readable medium, where each electrical component 804, 806, 808, and/or 810 can be corresponding code.

Figure 9:
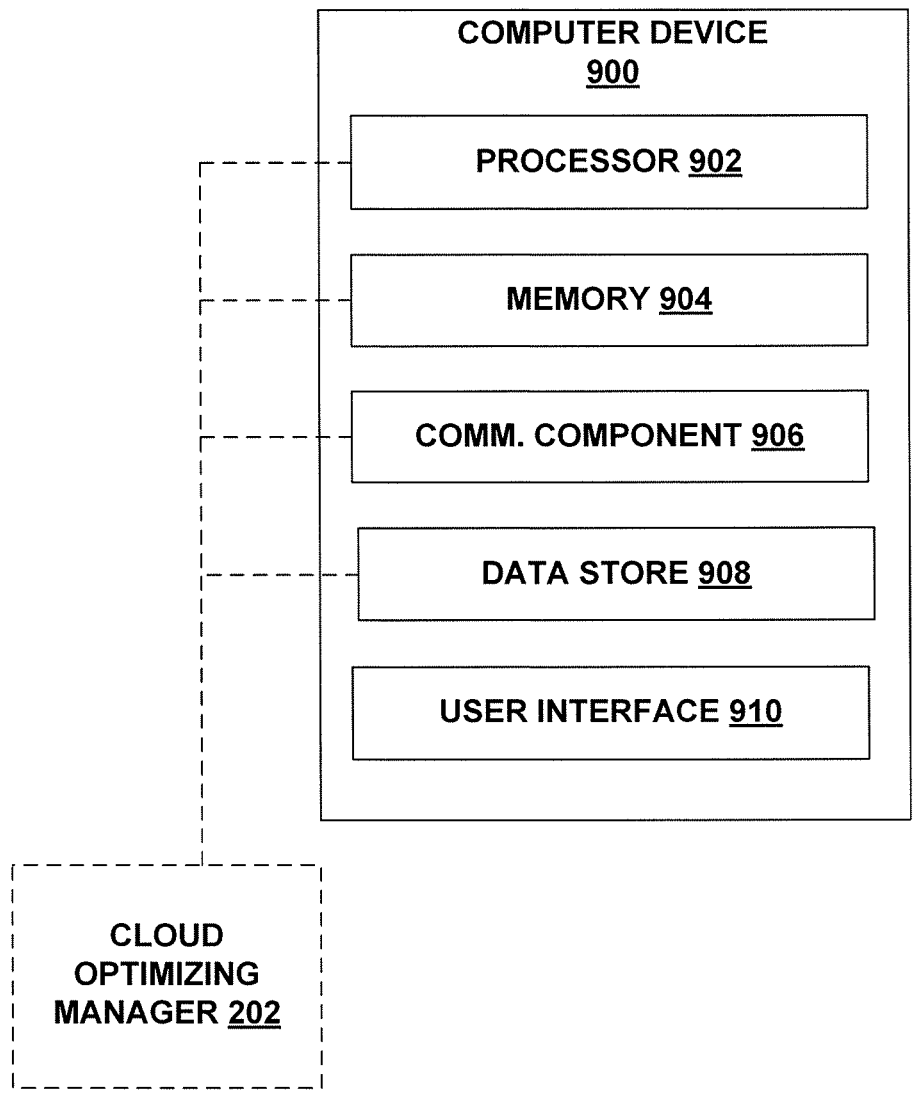
FIG. 9 is a block diagram illustrating aspects of a computer device according to the present disclosure.

Referring to FIG. 9, an aspect of a computer device 900 may be specially programmed or configured to perform the respective functions described herein of any one of the various components of cloud optimizing manager 202. For example, in one aspect, computer device 900 may include cloud optimizing manager 202, message transmittal component 204, message delay management component 206, and/or message scheduling component, as shown in FIG. 2.

Computer device 900 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system. For example, processor 902 may be configured to execute the described functions of cloud optimizing manager 202, message transmittal component 204, message delay management component 206, and/or message scheduling component 208.

Computer device 900 further includes a memory 904, such as for storing data used herein and/or local versions of applications and/or instructions or code being executed by processor 902, such as to perform the respective functions of the respective entities described herein. Memory 904 can include any type of memory usable by a computer, such as random access memory (RAM), read only memory (ROM), tapes, magnetic discs, optical discs, volatile memory, non-volatile memory, and any combination thereof. For example, memory 904 may be configured to store measurements associated with reselection or handover and/or interference target values as described herein with respect to memory 904 of base station interference manager 202.

Further, computer device 900 includes a communications component 906 that provides for establishing and maintaining communications with one or more parties utilizing hardware, software, and services as described herein. Communications component 906 may carry communications between components on computer device 900, as well as between computer device 900 and external devices, such as devices located across a communications network and/or devices serially or locally connected to computer device 900. For example, communications component 906 may include one or more buses, and may further include transmit chain components and receive chain components associated with a transmitter and receiver, respectively, or a transceiver, operable for interfacing with external devices. In an additional aspect, communications component 906 may be configured to receive one or more pages from one or more subscriber networks. In a further aspect, such a page may correspond to the second subscription and may be received via the first technology type communication services. For example, communications component 906 may be configured to perform the communications functions described herein of cloud optimizing manager 202.

Additionally, computer device 900 may further include a data store 908, which can be any suitable combination of hardware and/or software, that provides for mass storage of information, databases, and programs employed in connection with aspects described herein. For example, data store 908 may be a data repository for applications not currently being executed by processor 902 and/or any threshold values or finger position values. For example, data store 908 may be configured to store measurements reports associated with reselection or handover and/or interference target value associated with symbol files and database information associated with cloud optimizing manager 202.

Computer device 900 may additionally include a user interface component 910 operable to receive inputs from a user of computer device 900, and further operable to generate outputs for presentation to the user. User interface component 910 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof. For example, user interface component 910 may be configured to receive user input from cloud optimizing manager 202.

Figure 10:
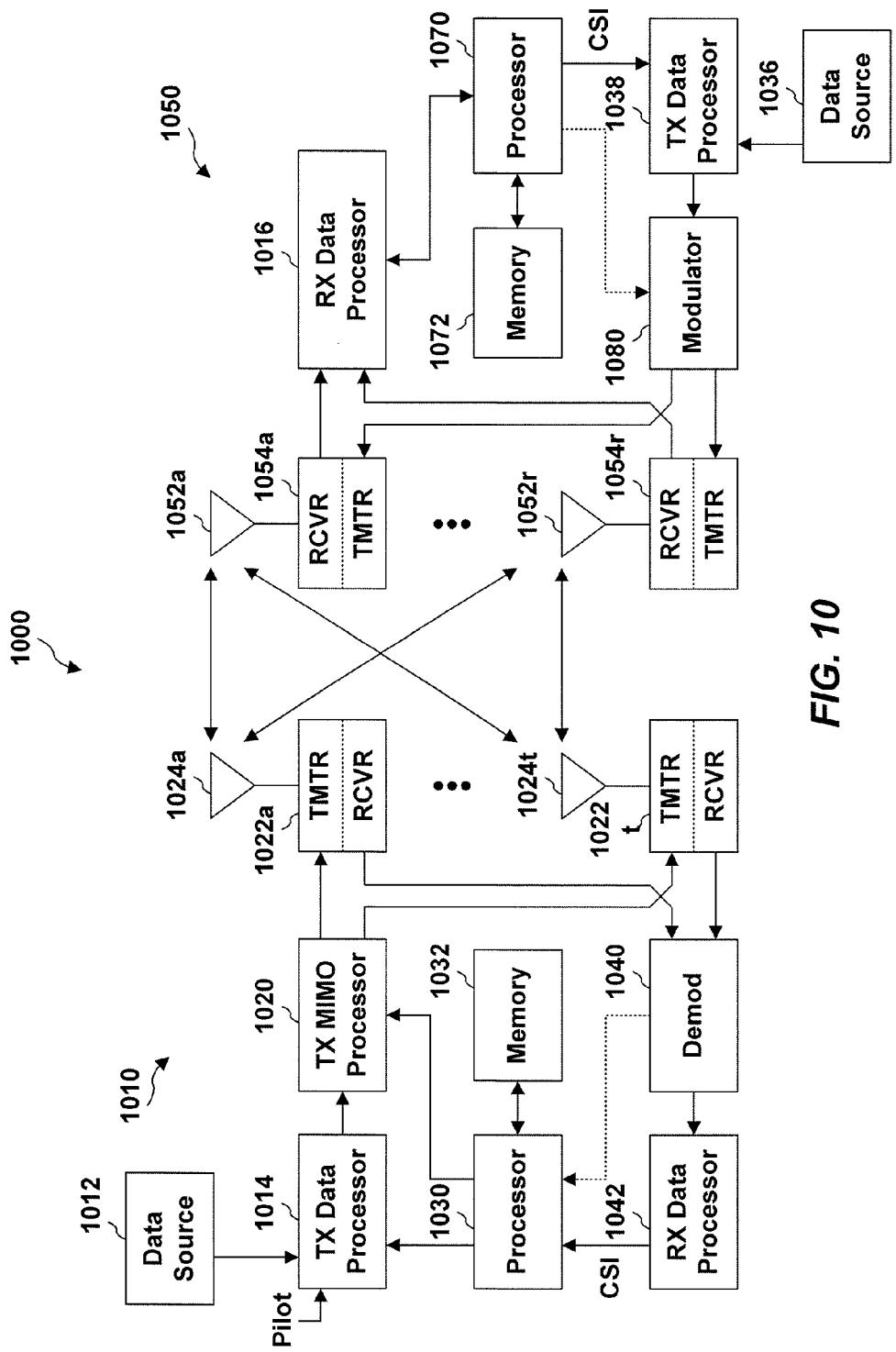
FIG. 10 is a schematic block diagram of an aspect of a wireless network environment that can be employed in conjunction with the various systems and methods described herein.

FIG. 10 shows an example wireless communication system 1000. The wireless communication system 1000 depicts a base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In an aspect, base station 1010 can be base station 102, and mobile device can be UE 122. Moreover, base station 1010 can be a low power base station, in one example, such as one or more femtocells previously described. In addition, it is to be appreciated that base station 1010 and/or mobile device 1050 can employ the example systems and methods (FIGS. 1-8) described herein to facilitate wireless communication there between. For example, components or functions of the systems and/or methods described herein can be part of a memory 1032 and/or 10102 or processors 1030 and/or 10100 described below, and/or can be executed by processors 1030 and/or 10100 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down converts) a respective signal, digitizes the conditioned signal to provide samples, and further processes the samples to provide a corresponding "received" symbol stream.

An RX data processor 1010 can receive and process the $N_R$ received symbol streams from $N_R$ receivers 1054 based on a particular receiver processing technique to provide $N_T$ "detected" symbol streams. RX data processor 10100 can demodulate, de-interleave, and decode each detected symbol stream to recover the traffic data for the data stream. The processing by RX data processor 10100 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 10310, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which pre-coding matrix to use for determining the beamforming weights.

Processors 1030 and 10100 can direct (e.g., control, coordinate, manage, etc.) operation at base station 1010 and mobile device 1050, respectively. Respective processors 1030 and 10100 can be associated with memory 1032 and 10102 that store program codes and data. For example, processor 1030 and/or 10100 can execute, and/or memory 1032 and/or 10102 can store instructions related to functions and/or components described herein, such as measuring signals or aspects thereof, determining whether to adjust UL rates, and/or the like, as described.

Figure 11:
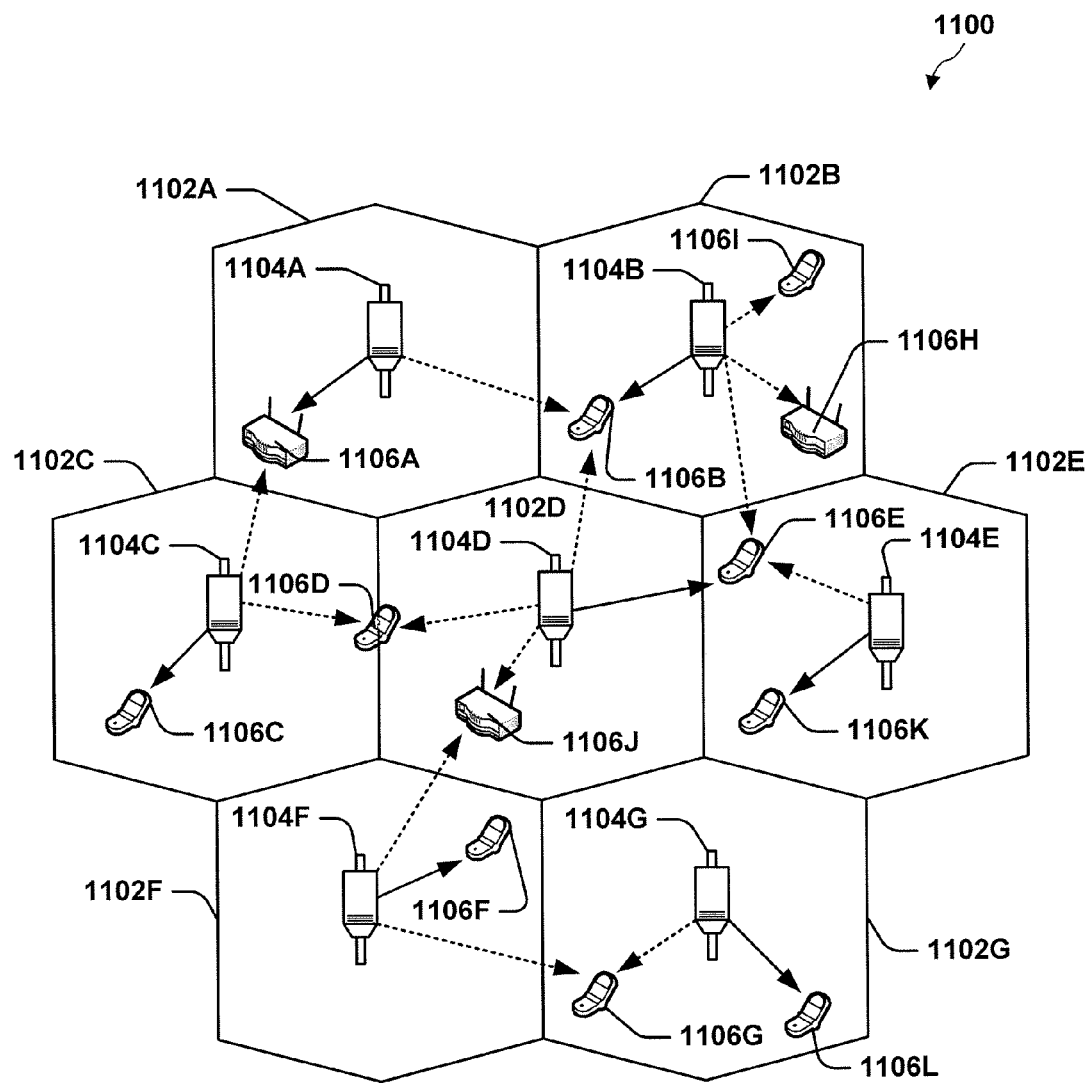
FIG. 11 illustrates an example wireless communication system, configured to support a number of devices, in which the aspects herein can be implemented.

FIG. 11 illustrates a wireless communication system 1100, configured to support a number of users, in which the teachings herein may be implemented. The system 1100 provides communication for multiple cells 1102, for example, 1102A-1102G, with each cell being serviced by a corresponding access node 1104 (for example, access nodes 1104A-1104G). In an aspect, cell 1102 can be base station, 102 and/or UE 122 (FIG. 1). As shown in FIG. 11, access terminals 1106 (e.g., access terminals 1106A-1106L) can be dispersed at various locations throughout the system over time. Each access terminal 1106 can communicate with one or more access nodes 1104 on a forward link (FL) and/or a reverse link (RL) at a given moment, depending upon whether the access terminal 1106 is active and whether it is in soft handoff, for example. The wireless communication system 1100 can provide service over a large geographic region.

Figure 12:
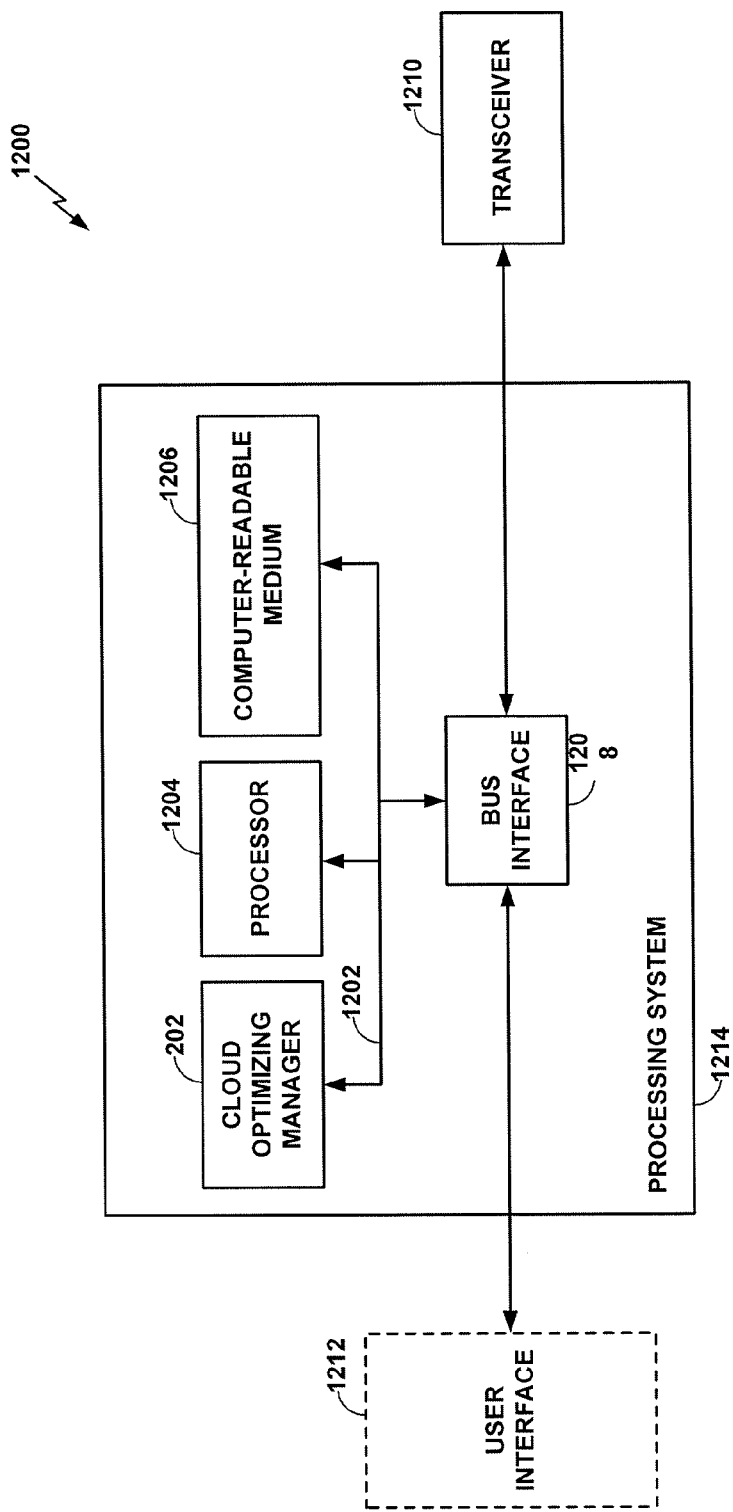
FIG. 12 is block diagram illustrating an example of a hardware implementation for an apparatus employing a processing system.

FIG. 12 illustrates an exemplary communication system 1200 where one or more base stations, for example, 112, 114, 116, and/or 118 may be deployed within a network environment. In an example aspect, system 800 can include multiple lower power base stations, for example, femto nodes, 810A and 810B. Each node 810 can be coupled to a wide area network 840 (e.g., the Internet) and a mobile operator core network 850 via a digital subscriber line (DSL) router, a cable modem, a wireless link, or other connectivity means (not shown). As will be discussed below, each femto node 810 can be configured to serve associated access terminals 820 (e.g., access terminal 820A) and, optionally, alien access terminals 820 (e.g., access terminal 820B). In other words, access to femto nodes 810 can be restricted such that a given access terminal 820 can be served by a set of designated (e.g., home) femto node(s) 810 but may not be served by any non-designated femto nodes 810 (e.g., a neighbor's femto node).

FIG. 12 is a block diagram illustrating an example of a hardware implementation for an apparatus 1200 employing a processing system 1214 for carrying out aspects of the present disclosure, such as methods for managing uplink interference at base station. In this example, processing system 1214 may be implemented with a bus architecture, represented generally by bus 1202. The bus 1202 may include any number of interconnecting buses and bridges depending on the specific application of the processing system 1214 and the overall design constraints. The bus 1202 links together various circuits including one or more processors, represented generally by the processor 1204, computer-readable media, represented generally by the computer-readable medium 1206, and one or more components described herein, such as, but not limited to, base station 102, user equipment (UE) 122 and/or cloud optimizing manager 112 (FIGS.

The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a means for communicating with various other apparatus over a transmission medium. Depending upon the nature of the apparatus, a user interface 1212 (e.g., keypad, display, speaker, microphone, joystick) may also be provided.

The processor 1204 is responsible for managing the bus 1202 and general processing, including the execution of software stored on the computer-readable medium 12012. The software, when executed by the processor 1204, causes the processing system 1214 to perform the various functions described infra for any particular apparatus. The computer-readable medium 12012 may also be used for storing data that is manipulated by the processor 1204 when executing software.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

For convenience, the disclosure herein describes functionality in the context of a femtocell. It should be appreciated, however, that a macro cell or a pico cell or any type of base station equipment can provide the same or similar functionality as a femtocell, but for a larger/smaller coverage area.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for optimizing a cloud based radio access network (RAN), comprising:
   transmitting a first message from a base station to a user equipment (UE);
   determining that a second message from the user equipment (UE) in response to the first message from the base station is not received by a media access control (MAC) scheduler within a selected amount of time, the MAC scheduler residing remotely at a MAC layer in a cloud;
   delaying re-transmission of the first message or transmitting a third message from the base station to the UE in response to determining that the second message from the UE is not received by the MAC scheduler within the selected amount of time; and
   scheduling other hybrid automatic repeat request (HARQ) processes of the UE or other UEs in intervening sub-frames after delaying re-transmission of the first message or transmitting of the third message from the base station to the UE.

2. The method of claim 1, wherein a physical (PHY) layer function of the RAN is located at the base station and a MAC layer function of the RAN is located remotely in a Cloud.

3. The method of claim 1, wherein the first message is a transport block on a downlink shared channel (DL-SCH) in a sub-frame 'n' of a plurality of sub-frames.

4. The method of claim 1, wherein the second message is an ACK or a NACK from the UE.

5. The method of claim 1, the delaying further comprising:
   delaying re-transmission of the first message or the transmitting of the third message to accommodate delays associated with backhaul.

6. The method of claim 1, wherein the second message is not received within a selected number of sub-frames due to delays associated with processing at a receiver or a transmitter of the base station, scheduling at the MAC layer, or communications between a physical (PHY) layer and the MAC layer.

7. The method of claim 1, further comprising:
   receiving multiple sets of assignments from the MAC layer, wherein the multiple sets of assignments correspond to various combinations of received ACK/NACK messages at the physical (PHY) layer of the base station.

8. An apparatus for optimizing a cloud based radio access network (RAN), comprising:
   means for transmitting a first message from a base station to a user equipment (UE);
   means for determining that a second message from the user equipment (UE) in response to the first message from the base station is not received by a media access control (MAC) within a selected amount of time, the MAC scheduler residing remotely at a MAC layer in a cloud;
   means for delaying re-transmission of the first message or transmitting a third message from the base station to the UE in response to determining that the second message from the UE is not received by the MAC scheduler within the selected amount of time; and
   means for scheduling other hybrid automatic repeat request (HARQ) processes of the UE or other UEs in intervening sub-frames after delaying re-transmission of the first message or transmitting of the third message from the base station to the UE.

9. The apparatus of claim 8, wherein a physical (PHY) layer function of the RAN is located at the base station and a MAC layer function of the RAN is located remotely in a Cloud.

10. The apparatus of claim 8, wherein the first message is a transport block on a downlink shared channel (DL-SCH) in a sub-frame 'n' of a plurality of sub-frames.

11. The apparatus of claim 8, wherein the second message is an ACK or a NACK from the UE.

12. The apparatus of claim 8, the means for delaying further comprises:
    means for delaying re-transmission of the first message or the transmitting of the third message to accommodate delays associated with backhaul.

13. The apparatus of claim 8, wherein the second message is not received within a selected number of sub-frames due to delays associated with processing at a receiver or a transmitter of the base station, scheduling at the MAC layer, or communications between a physical (PHY) layer and the MAC layer Cloud.

14. The apparatus of claim 8, further comprising:
    means for receiving multiple sets of assignments from the MAC layer, wherein the multiple sets of assignments correspond to various combinations of received ACK/NACK messages at the physical (PHY) layer.

15. A non-transitory computer readable medium storing computer executable code for optimizing a cloud based radio access network (RAN), comprising:
    code for transmitting a first message from a base station to a user equipment (UE);
    code for determining that a second message from the user equipment (UE) in response to the first message from the base station is not received by a media access control (MAC) scheduler within a selected amount of time, the MAC scheduler residing remotely at a MAC layer in a cloud;
    code for delaying re-transmission of the first message or transmitting of a third message from the base station to the UE in response to determining that the second message from the UE is not received by the MAC scheduler within the selected amount of time; and
    code for scheduling other hybrid automatic repeat request (HARM) processes of the UE or other UEs in intervening sub-frames after delaying re-transmission of the first message or transmitting of the third message from the base station to the UE.

16. The computer readable medium of claim 15, wherein a physical (PHY) layer function of the RAN is located at the base station and a MAC layer function of the RAN is located remotely in a Cloud.

17. The computer readable medium of claim 15, wherein the first message is a transport block on a downlink shared channel (DL-SCH) in a sub-frame 'n' of a plurality of sub-frames.

18. The computer readable medium of claim 15, wherein the second message is an ACK or a NACK from the UE.

19. The computer readable medium of claim 15, the delaying further comprising:
    code for delaying re-transmission of the first message or transmission of the third message to accommodate delays associated with backhaul.

20. The computer readable medium of claim 15, wherein the second message is not received within a selected number of sub-frames due to delays associated with processing at a receiver or a transmitter of the base station, scheduling at the MAC layer, or communications between a physical (PHY) layer and the MAC layer.

21. The computer readable medium of claim 15, further comprising:
    code for receiving multiple sets of assignments from the MAC layer, wherein the multiple sets of assignments correspond to various combinations of received ACK/NACK messages at the physical (PHY) layer of the base station.

22. An apparatus for optimizing a cloud based radio access network (RAN), comprising:
    a memory configured to store data; and
    one or more processors communicatively coupled with the memory, wherein the one or more processors and the memory are configured to:
        transmit a first message from a base station to a user equipment (UE);
        determine that a second message from the user equipment (UE) in response to the first message from the base station is not received by a media access control (MAC) scheduler within a selected amount of time, the MAC scheduler residing remotely at a MAC layer in a cloud;
        delay re-transmission of the first message or transmitting a third message from the base station to the UE in response to determining that the second message from the UE is not received by the MAC scheduler within the selected amount of time; and
        schedule other hybrid automatic repeat request (HARQ) processes of the UE or other UEs in intervening sub-frames after delaying re-transmission of the first message or transmitting of the third message from the base station to the UE.

23. The apparatus of claim 22, wherein a physical (PHY) layer function of the RAN is located at the base station and a MAC layer function of the RAN is located remotely in a Cloud.

24. The apparatus of claim 22, wherein the first message is a transport block on a downlink shared channel (DL-SCH) in a sub-frame 'n' of a plurality of sub-frames.

25. The apparatus of claim 22, wherein the second message is an ACK or a NACK from the UE.

26. The apparatus of claim 22, wherein the one or more processors and the memory are further configured to:
    delay re-transmission of the first message or transmission of the third message to accommodate delays associated with backhaul.

27. The apparatus of claim 22, wherein the second message is not received within a selected number of sub-frames due to delays associated with processing at a receiver or a transmitter of the base station, scheduling at the MAC layer, or communications between a physical (PHY) layer and the MAC layer.

28. The apparatus of claim 22, wherein the one or more processors and the memory are further configured to:
    receive multiple sets of assignments from the MAC layer, wherein the multiple sets of assignments correspond to various combinations of received ACK/NACK messages at the physical (PHY) layer of the base station.

* * * * *